United States Patent [19]

Doherty

[11] Patent Number: 4,658,559
[45] Date of Patent: Apr. 21, 1987

[54] TRIPLE-GLAZE GREENHOUSE STRUCTURE

[75] Inventor: Henry R. Doherty, Richmond, Ind.

[73] Assignee: Winandy Greenhouse Company, Inc., Richmond, Ind.

[21] Appl. No.: 655,888

[22] Filed: Sep. 28, 1984

[51] Int. Cl.[4] .............................................. E04C 1/34
[52] U.S. Cl. ........................................ 52/463; 52/90; 52/732
[58] Field of Search ................. 52/460, 461, 463, 464, 52/483, 732, 481, 204, 200, 18, 90; 47/17

[56] References Cited

U.S. PATENT DOCUMENTS

| | | | |
|---|---|---|---|
| 1,812,009 | 6/1931 | Lenke | 52/463 X |
| 2,073,278 | 3/1937 | Hohl | 52/461 |
| 3,498,368 | 3/1970 | Conangle | 165/53 |
| 3,844,086 | 10/1974 | Radlhe | 52/464 X |
| 3,844,087 | 10/1974 | Schultz et al. | 52/200 |
| 4,265,300 | 5/1981 | Kurimoto | 165/47 |
| 4,463,534 | 8/1984 | Crigler | 47/17 X |

FOREIGN PATENT DOCUMENTS

| | | | |
|---|---|---|---|
| 2415695 | 9/1979 | France | 52/461 |
| 209130 | 6/1940 | Switzerland | 52/463 |
| 710125 | 6/1954 | United Kingdom | 52/464 |

OTHER PUBLICATIONS

Sectional drawings of a panel member support structure, Conalco, Inc., dated Mar. 27, 1979.
Sectional drawings of a panel member support structure, Conalco, Inc., dated Aug. 4, 1976.

Primary Examiner—Carl D. Friedman
Attorney, Agent, or Firm—Barnes & Thornburg

[57] ABSTRACT

A greenhouse is disclosed which has enhanced thermal insulative characteristics. The greenhouse includes an elongated, extruded support bar for supporting light transmissive, transparent or translucent panel members. In cross section, the support bar includes a generally vertical stand portion having a base and a crown. A laterally extending outer shelf is provided adjacent the crown for supporting an outer light transmissive panel member. A laterally extending inner shelf is provided adjacent the base for supporting an inner light transmissive panel member. A laterally extending middle shelf is provided between the outer shelf and inner shelf for supporting a middle light transmissive panel member. The inner and middle shelves are dimensioned to permit the inner and middle light transmissive panel members to be placed on the inner and middle shelves from inside the greenhouse.

20 Claims, 22 Drawing Figures

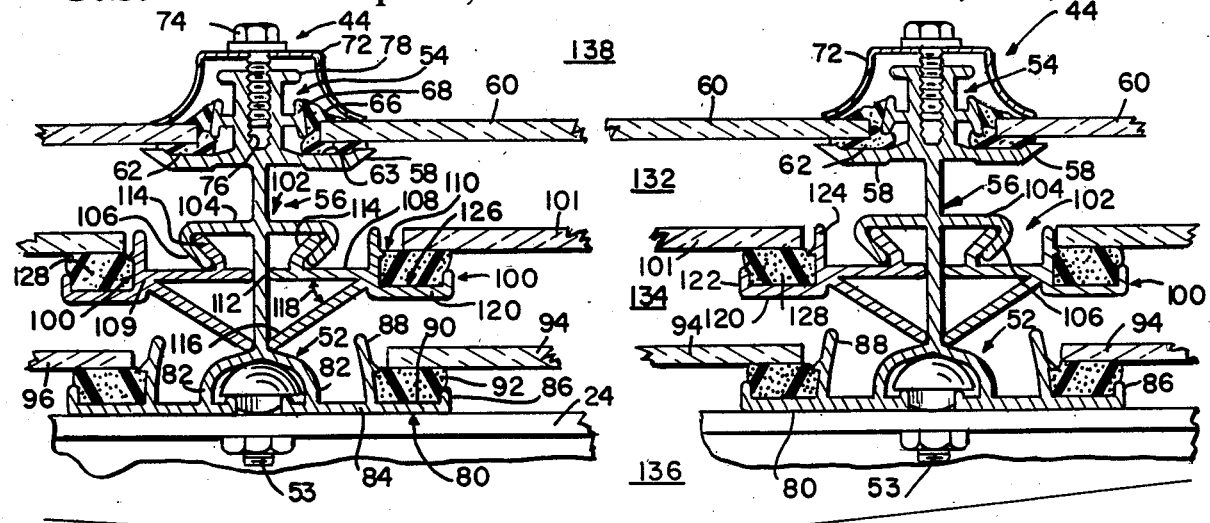
FIG. 3
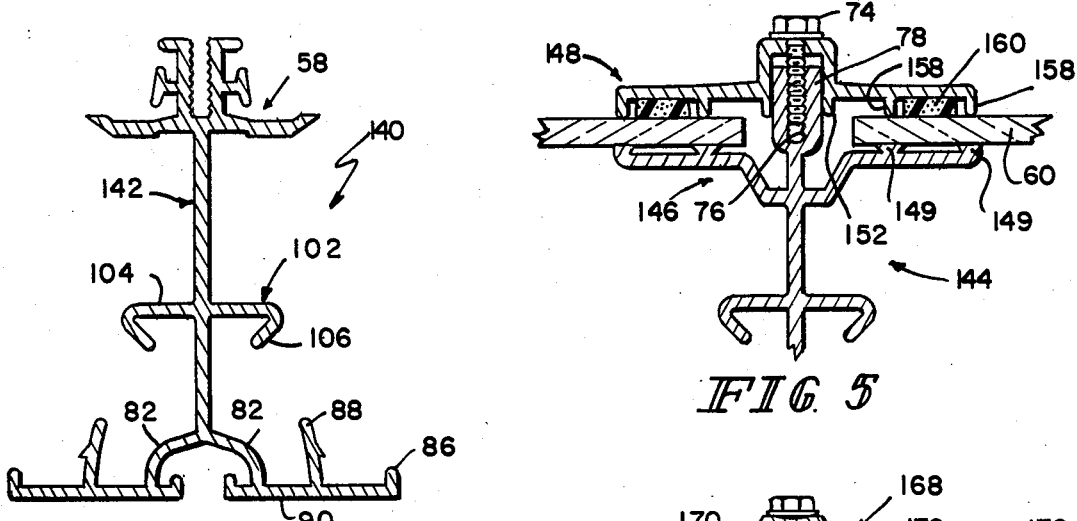
FIG. 4
FIG. 5
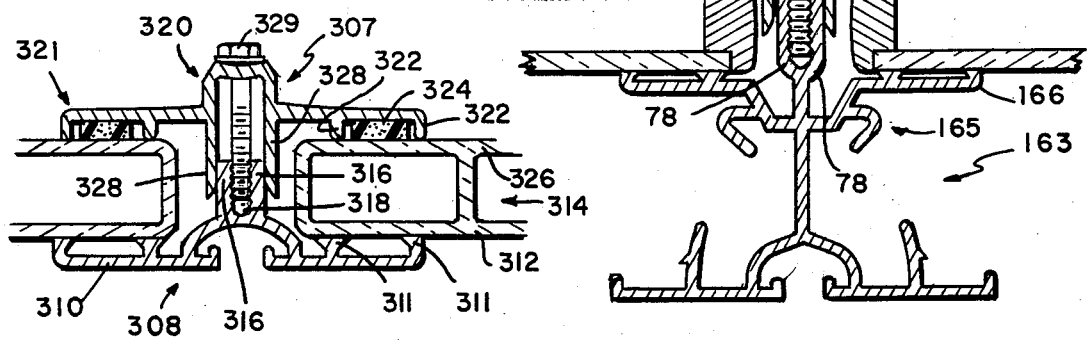
FIG. 13
FIG. 6

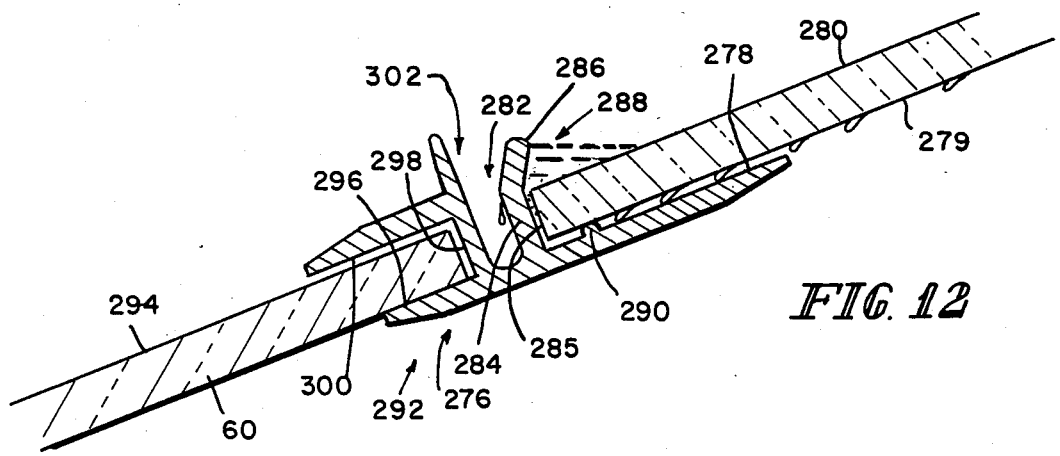
FIG. 12
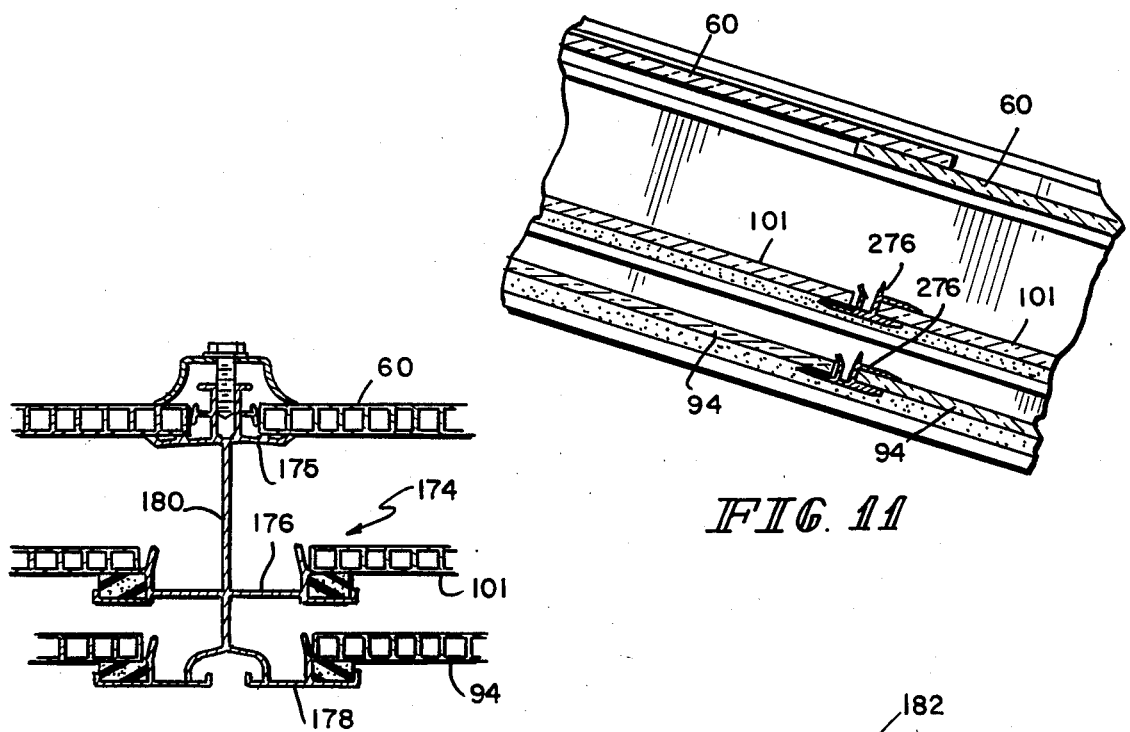
FIG. 11
FIG. 7
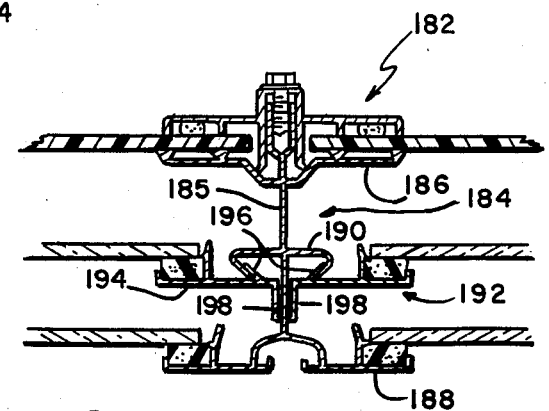
FIG. 8

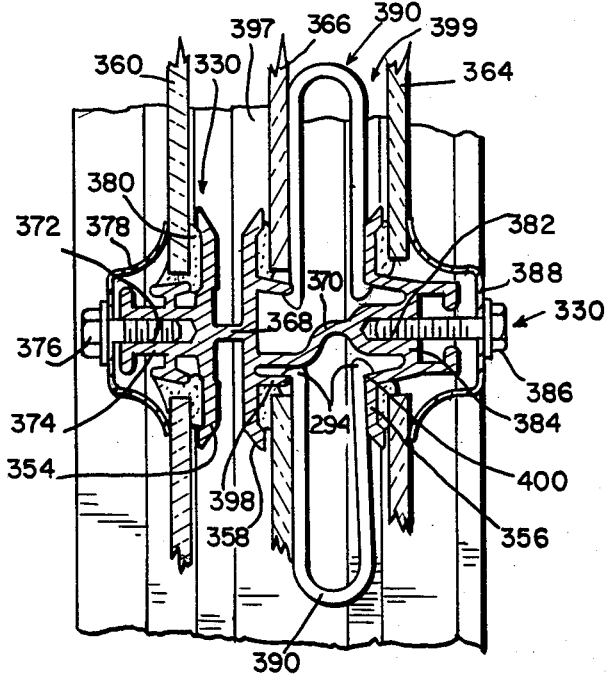
FIG. 15
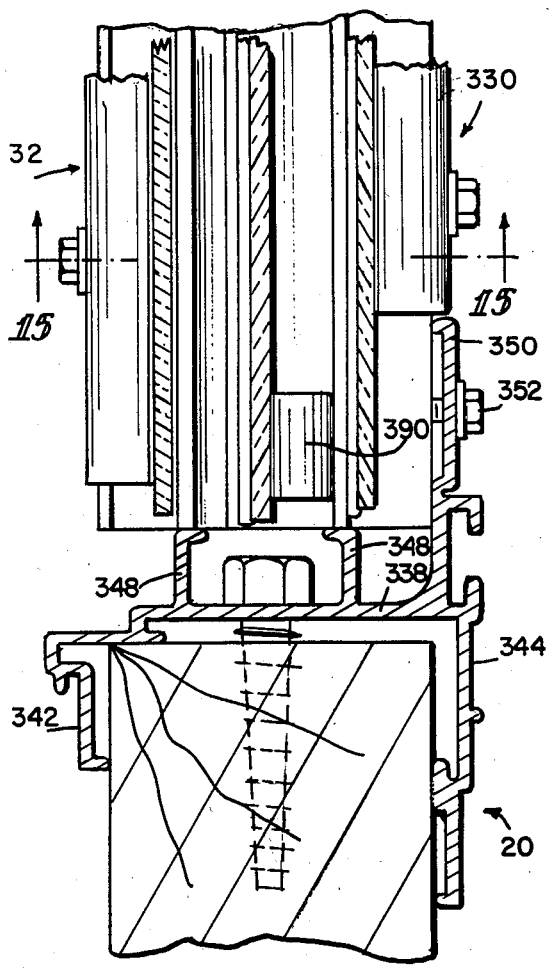
FIG. 14
FIG. 16
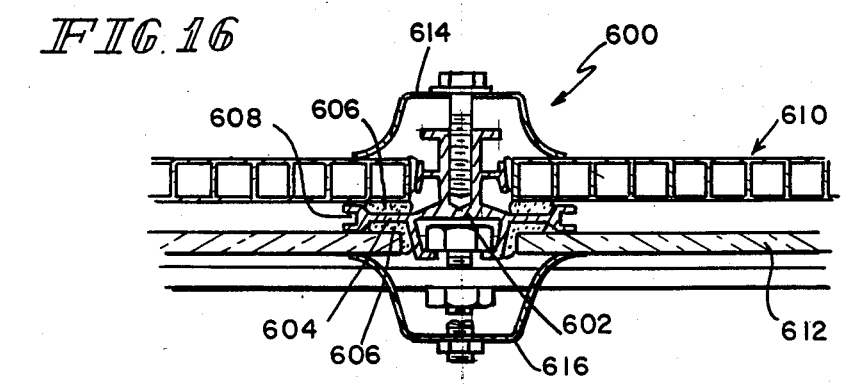
FIG. 22

TRIPLE-GLAZE GREENHOUSE STRUCTURE

The present invention relates to buildings and more particularly to wall structures for buildings made from transparent or translucent panel members. The invention is directed particularly to providing means for enhancing the thermal insulative characteristics of such buildings. As used herein, "wall" includes both roofs and side walls.

One example of such a building is a greenhouse. Greenhouses generally have metal frames which support a plurality of transparent or translucent glass or plastic panels, with the panels forming the roof and side walls of the greenhouse. These light transmissive panel members permit light to pass into the interior of the greenhouse to foster the growth of the plants in the greenhouse. Other examples of buildings having walls made from such panel members include various residential and commercial buildings wherein one or more light transmissive walls are provided for either functional or aesthetic purposes. For example, some restaurants and buildings use light transmissive panel members in their roofs to create sunlit atriums. As used herein, greenhouse refers to all buildings having roofs, side walls, or portions thereof which are formed from transparent or translucent members, but does not include conventional buildings having generally opaque walls with transparent or translucent windows.

One difficulty encountered with the use of light transmissive wall members is that many are rather poor thermal insulators. Thus the expenditure of substantial amounts of energy, and hence money, can be required to maintain the greenhouses at an acceptable temperature. The difficulty of insulating greenhouses is compounded by the fact that the transparency or translucency of the walls precludes the use of conventional insulation means, such as fiberglass or polystyrene. The placement of opaque materials such as polystyrene or fiberglass insulation adjacent the walls of a greenhouse would destroy the transparency of the walls.

One known arrangement for providing insulation of greenhouses is accomplished through the use of wall support structures which permit the use of double layers of panel members. The dead air space formed between the two layers of a double walled structure helps to retard the flow of heat between the exterior and the interior of the greenhouse. Although double walled greenhouse structures are more energy efficient than single walled structures, there is substantial room for improvement.

One other difficulty with some present known double walled greenhouse structures is that both the layers must be placed on the greenhouse wall during the construction of the greenhouse. Such structures do not permit greenhouse owners to construct their greenhouses with a single layered wall initially, and then add additional layers later. The ability to add additional wall layers is often desirous in situations where the greenhouse owner has insufficient funds to construct this greenhouse initially with a multi-layered wall.

In accordance with the present invention, an elongated extruded support bar is provided for supporting light transmissive panel members of a greenhouse. In cross section, the support bar comprises a generally vertical stand portion having a base and a crown. A laterally extending outer shelf is provided adjacent the crown for supporting an outer light transmissive panel member. A laterally extending inner shelf is provided adjacent the base for supporting an inner light transmissive member. A laterally extending middle shelf is provided between the outer shelf and inner shelf for supporting a middle light transmissive panel member. The inner and middle shelves are dimensioned to permit the inner and middle light transmissive panel members to be placed on the inner and middle shelves from inside the greenhouse.

One aspect of the present invention is that an extruded support bar structure is formed which can accommodate three panels of glass to form a triple glaze (triple layered) wall structure. A triple-glaze wall structure has the advantage of providing a greenhouse wall having two insulating dead air spaces between the interior and exterior of the greenhouse. The two dead air spaces provide superior insulation qualities when compared with some existing double-glaze walls having a single dead air space, and single-glaze walls having no dead air space. Thus, through the use of the triple-glaze support bar of the present invention, the owner of a greenhouse can reduce his energy costs. The extruded nature of the support bars enables the greenhouse manufacturer to use identically formed parts to provide greenhouses of various sizes. The manufacturer is able to form the support bars identically, and then cut the support bars to the size required for a particular greenhouse.

Another aspect of the present invention is that the inner and middle shelves of the support bar are positioned to enable panel members to be placed on the shelves, and hence added to the walls, from the inside of the greenhouse. This has the advantage of facilitating the retrofitting of second and third layers of paneling on to single layered structures, while utilizing the greenhouse's existing support structure. Often, greenhouse owners will build their greenhouses having a single-glaze wall structure. The owners, however, may wish to add a second or third layer to the walls of the greenhouse at a later date, when more money becomes available or when the costs of heating and/or air-conditioning the greenhouse make it cost-effective to improve the insulation of the greenhouse by providing the additional panel layers.

It is also an aspect of one embodiment of the present invention that the middle shelf of the support bar can be designed to be selectively attachable to the support bar. This has the advantage of facilitating the integration of a later added middle shelf onto an existing support structure.

Also in accordance with the present invention, an extruded came is provided for forming a joint between first and second coplanar transparent panel members of a greenhouse. The came comprises a supporting surface extending in a plane generally parallel to the first panel member for receiving a surface of the first panel member. An upstanding leg portion is provided for receiving an edge of the first panel member. A generally C shaped portion is provided for receiving the second panel. The C shaped portion and upstanding leg portion define a generally transverse channel therebetween for conducting moisture.

In a preferred embodiment, the upstanding leg portion of the came includes an angled portion extending above the surface of the first panel member. The upstanding leg portion provides a dam for trapping moisture. Additionally, a spacer means can be provided on the supporting surface of the came for placing the supported surface of the first panel member in a spaced relation from the supporting surface. This spaced relation permits moisture to flow between the came and the first panel member.

One feature of the came is that it is formed to lock the panel member in position on the came. The locking feature helps to maintain the panel member in position on the came to prevent the panel from becoming dislodged from the came by wind gusts.

Another feature of the came is that a spacer is provided which maintains the panel member in a spaced relation from the shelf on which it rests. The spacer feature has the advantage of permitting moisture which collects on the underside of the panel to be directed around an edge of the panel member, over a top stop, and into a channel. Once the moisture is directed into the channel, the moisture can be directed by the channel into a condensate-carrying channel on a roof support structure adjacent the came and then to either the eaves or the gutters of the greenhouse. Ultimately, the moisture can be conducted to a point either inside or outside the greenhouse.

In accordance with another embodiment of the present invention, an extruded add on support bar for a panel member of a greenhouse is provided which is attachable to an existing panel member support structure having an upwardly opening screw slot, and at least one laterally extending shelf for supporting a transparent panel member. The add-on support bar comprises, in cross section, a downwardly extending tongue which is insertable into the screw slot of the existing support structure. A laterally extending shelf is provided for supporting a panel member. The shelf is positioned generally parallel to the laterally extending shelf of the existing support structure. An upwardly opening screw slot is provided which is vertically aligned with the downwardly extending tongue, and a cap structure is provided for securing the panel member on the shelf of the add-on support bar. An attachment means is also provided for attaching the add-on support structure to the existing support bar.

One feature of the present invention is that an extruded add-on support bar is provided which is attachable to an existing support structure. This feature has the advantage of enabling greenhouse owners to add an additional layer of light transmissive paneling to their existing greenhouse structures. Thus, greenhouse owners can convert their single- or double-glaze greenhouses into double- or triple-glaze greenhouses, respectively. The add-on support bar is designed so that it can be placed on a wide variety of existing structures.

An additional object of the present invention is to provide a means for improving the insulative quality of both existing and new greenhouse structures, which does not require the installation of an additional layer of glazing.

In accordance with one embodiment of the present invention, means are provided for introducing a gas into a space between two panel members of a greenhouse having at least a two-panel wall structure, with the two panels defining the space therebetween. The gas introduced into the space is of a type which has a thermal conductivity lower than air and preferably is beneficial to plant growth.

Preferably, the gas introduced consists essentially of carbon dioxide, which can be obtained from the exhaust of the burning of fossil fuels, such as LP gas. The introduction of carbon dioxide into the dead air space between the panel layers of a double-glaze structure, or into one or both dead air spaces between the panel layers of a triple glaze structure, has the advantage of improving the insulative qualities of a double or triple glaze greenhouse wall. Because $CO_2$ has a lower thermal conductivity than air, heat or coldness is less easily transferred through the dead air spaces from the outside of the greenhouse to the inside of the greenhouse. Also, the carbon dioxide helps to remove moisture from the dead air spaces. The moisture, if left in the dead air spaces, can reduce the amount of sunlight entering the greenhouse. Additionally, the $CO_2$ which is introduced into the dead air space can be directed ultimately into the interior of the greenhouse to promote the growth of plants in the greenhouse. As is known, green plants require carbon dioxide to carry out their photosynthetic reactions.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 1 is a perspective view, partly broken away, of a greenhouse the present invention;

FIG. 2 a diagrammatic side view of the greenhouse of the present invention;

FIG. 3 is a sectional view taken along line 3—3 of FIG. 1 of a panel member support structure of the present invention;

FIG. 4 is another embodiment of a panel member support structure of the invention;

FIG. 5 is a sectional view, partly broken away, of another embodiment of a panel member support structure of the present invention;

FIG. 6 is a sectional view of another embodiment of a panel member support structure of the present invention;

FIG. 7 is a sectional view of another embodiment of a panel member support structure of the present invention;

FIG. 8 is a sectional view of another embodiment of a panel member support structure of the present invention;

FIG. 11 is a sectional view taken along line 11—11 of FIG. 1;

FIG. 12 is an enlarged, sectional view of one of the extruded cames shown in FIG. 11;

FIG. 13 is a sectional view of a ventilator or fixed plastic panel wall support structure of the present invention;

FIG. 14 is a sectional view taken along line 14—14 of FIG. 1 showing an alternate embodiment of a panel member support structure of the present invention;

Figure 17:
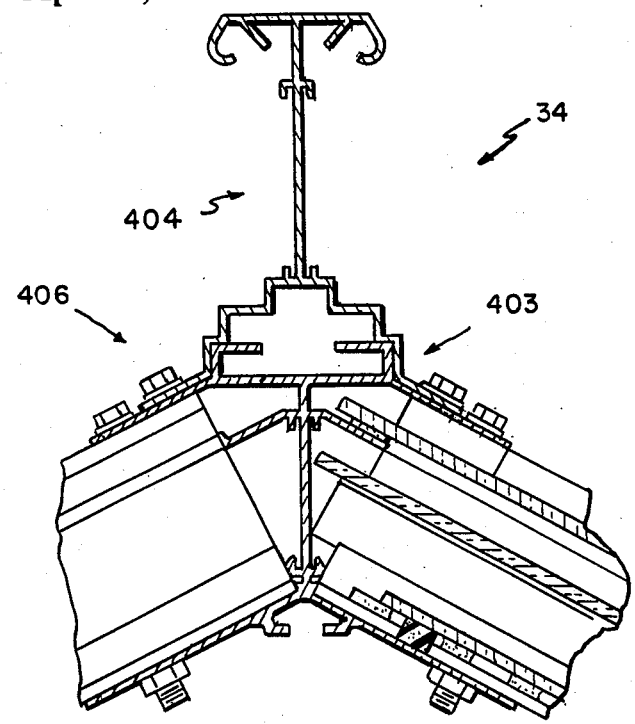
Figure 18:
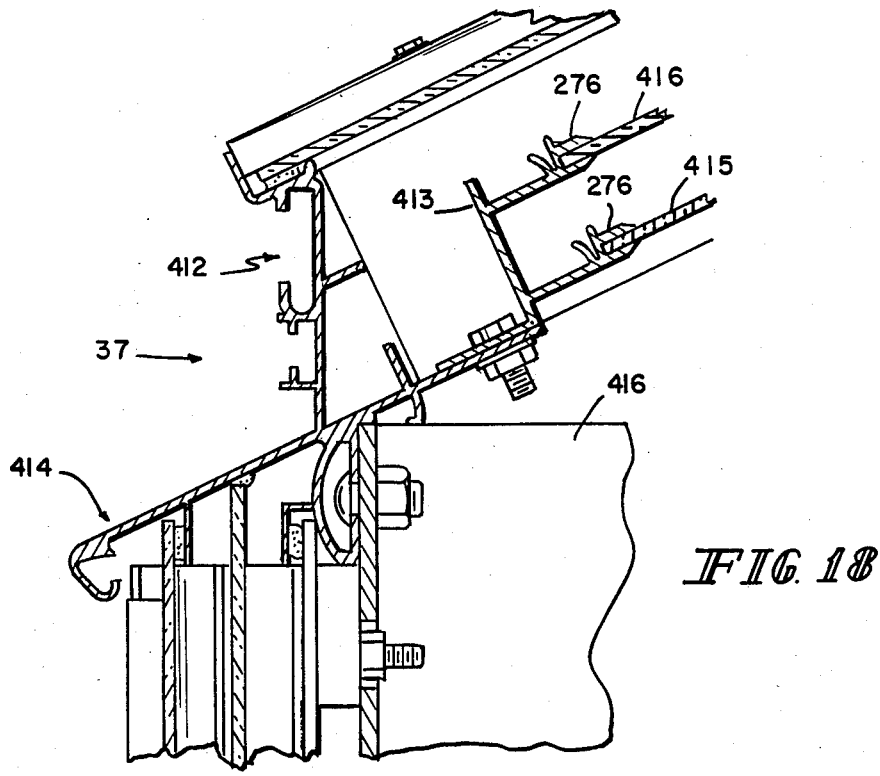
Figure 20:
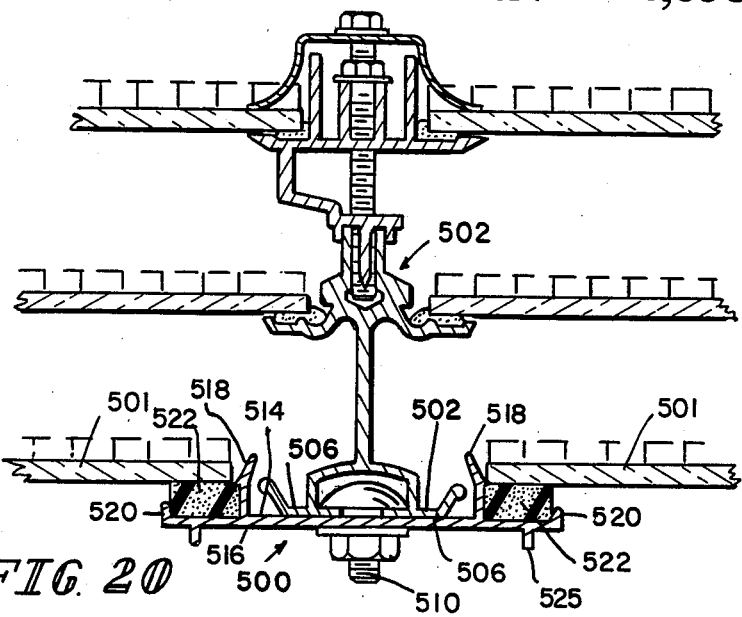
Figure 21:
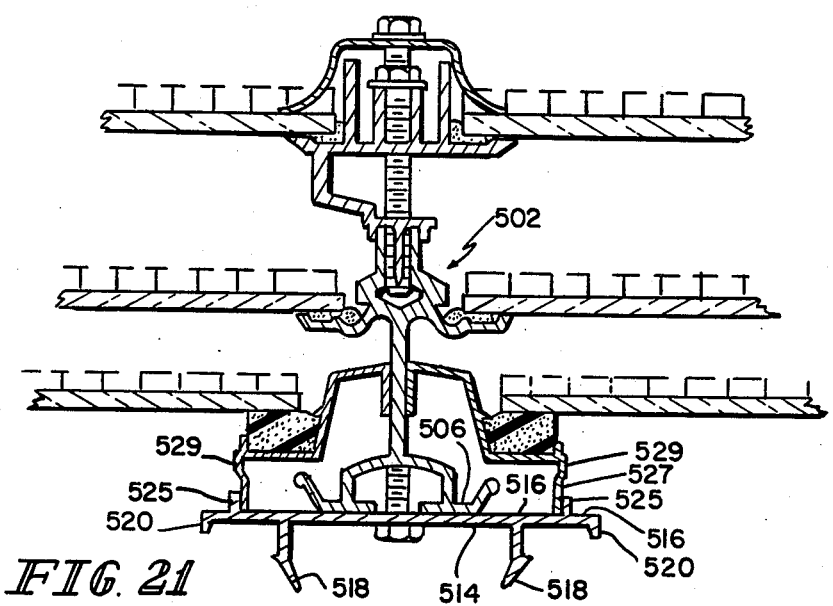
Figure 19:
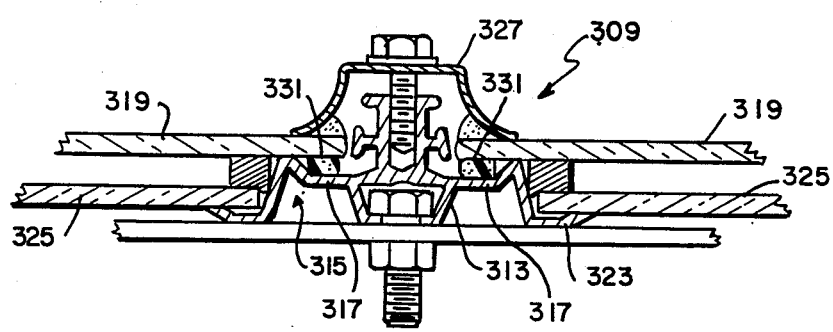

FIG. 15 a sectional view taken along line 15—15 of FIG. 14;

FIG. 16 is a perspective view of the clip member shown in FIGS. 14 and 15;

FIG. 17 is a sectional view of a roof peak support structure usable with single, double or triple glazed walls;

FIG. 18 is a sectional view of a support structure used at the intersection of the roof and side walls of the greenhouse of the present invention;

FIG. 19 is a sectional view of an alternate embodiment ventilator or fixed plastic panel wall support structure of the present invention;

FIG. 20 is a sectional view of another embodiment of a panel member support structure of the present invention, showing an internal converter support plate; and FIG. 21 is a sectional view, similar to FIG. 20, showing the internal converter support plate in an inverted position.

FIG. 22 is a sectional view of an alternate embodiment of a ventilator or fixed plastic panel wall support structure of the present invention.

Figure 1:
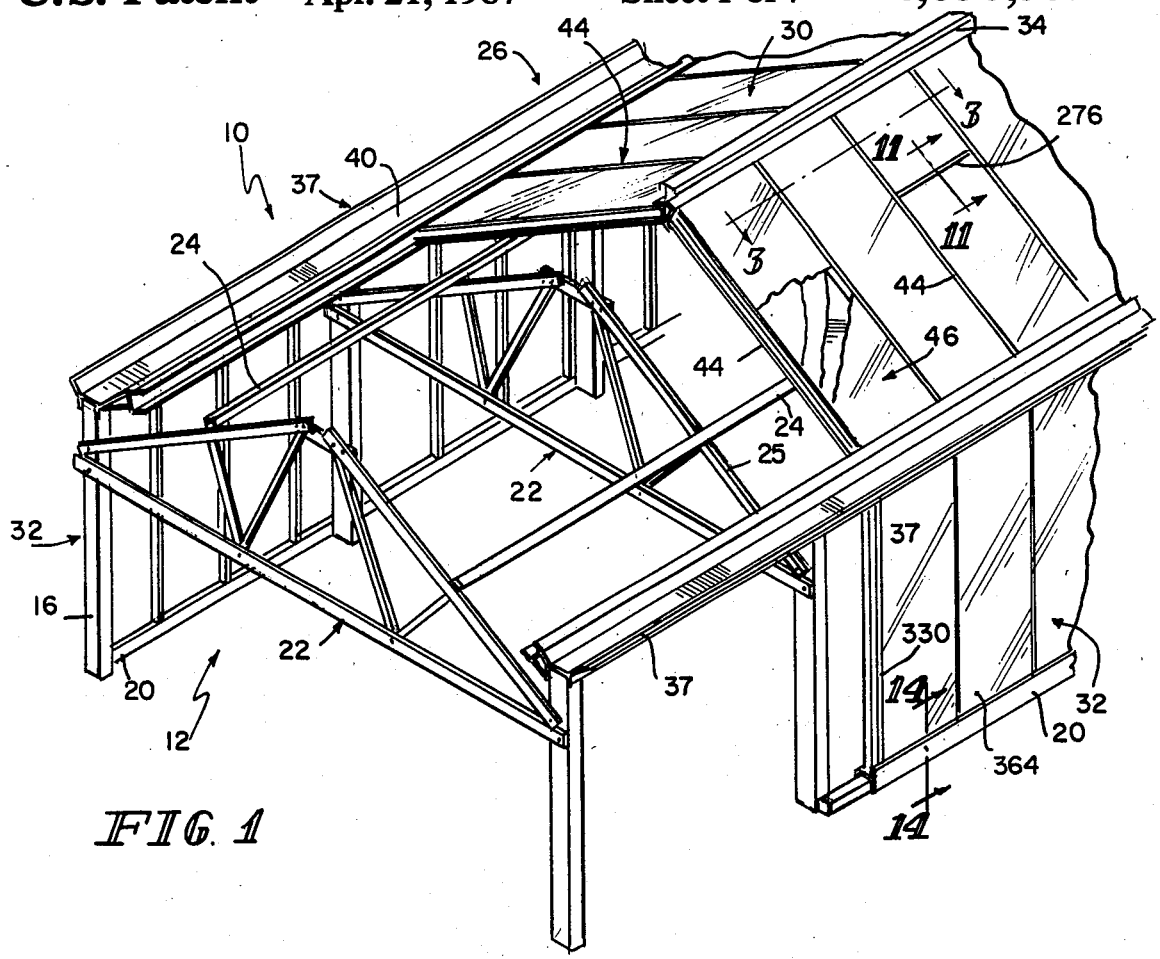

A greenhouse 10 constructed according to the present invention is shown in FIG. 1 as including a frame 12. The frame 12 includes a plurality of spaced vertical posts 16, horizontally extending beams including top wall joint support structures 37 and bottom plates 20, and a series of spaced trusses 22 which extend between opposite side walls 32. One or more purlins 24 extend generally parallel to the to wall joint support structures 37 and are connected between rafters 25 of the trusses 22.

The frame 12 is provided for supporting the outer surfaces 26 of the greenhouse 10. Outer surfaces 26 include the roof 30 and the side walls 32 of the greenhouse 10. The roof 30 of the greenhouse includes an extruded, elongated peak support structure 34 which is shown in greater detail in FIG. 17 and described, infra. The peak support structure 34 extends generally along the entire length of the roof 30 at the highest point of the roof 30. The pair of extruded wall joint support structures 37 extend along the base of the roof at the intersection of the roof 30 and side walls 32 to provide a joint between the roof 30 and side walls 32. The wall joint support structures 37 are shown in greater detail in FIG. 18, and may include a gutter 40 for collecting moisture from the roof 30 and directing the moisture to a downspout (not shown).

The roof 30 includes a series of spaced, extruded, elongated support bars 44 which extend between the peak support structure 34 of the roof and the wall joint support structure 37. The support bars 44 extend in a direction generally transverse to the direction of elongation of the peak 34 and wall joints 37. The support bars 44, are secured onto the purlins 24 by nut and bolt or screw arrangements such as carriage or the bolt 53. The support bars 44 support the light transmissive panel members 46 which comprise the majority of the surface area of the outer surface 26 of the greenhouse 10. As will be appreciated, panel members 46 can be made from a light transmissive glass or a plastic.

A pair of extruded support bars 44 are shown in cross section in FIG. 3. As used herein, directions such as vertically, laterally, downwardly, and upwardly are given with reference to the disposition of the various parts of the support bars 44 as they appear in cross section, and not necessarily as they would appear when installed on the greenhouse 10.

The support bars 44 are preferably formed by extruding aluminum. By forming the support bars 44 through an extrusion process, the manufacturer has more flexibility in producing support bars 44 of various lengths. This flexibility enables the manufacturer to construct greenhouses of various sizes using support bars 44 having the same cross sectional shape by cutting the support bars 44 to fit the size of the greenhouse being constructed. As will be appreciated, the parts of each support bar 44 extend throughout the entire length of the support bar 44.

Support bars 44 include a base 52, a crown 54, and a generally vertical stand portion 56 disposed between the base 52 and crown 54. A pair of outer shelves 58 are integrally formed with the stand portion 56 for supporting a pair of outer panel members 60. A threaded screw slot 76 is formed by a pair of parallel upstanding legs 78. Each of the legs 78 includes a ridged interior surface for engaging the threads of fasteners. An aluminum cap 72 is attached to the support bar 44 by a threaded fastener, such as screw 74, to secure the outer panel members 60 onto the outer shelf 58. Screw 74 extends through the aluminum cap 72 and engages a threaded screw slot 76 at the crown 54 of the support bar 44.

The cap 72 and screw 74 mechanically secure the outer panel members 60 on the support bar 44 to prevent the outer panel members 60 from becoming dislodged by the wind outside the greenhouse. Additionally, a sealing substance, such as butyl rubber bedding is interposed between the outer panel members 60 and the outwardly facing surfaces 63 of the outer shelves 58 to thermally seal the outer panel members 60 to the support bar 44. A similar caulking butyl rubber sealing substance 66 can also be placed between T shaped ridges 68 of the crown 54 and the upper surfaces of the panel members 60. Preferably, the butyl rubber bedding is used only for sealing the outer panel members 60. Preferably, the butyl rubber bedding is not used with the inner panel members 94 or middle panel members 101 because it's highly adhesive qualities restrict the ability of the greenhouse owner to remove the inner 94 and middle 101 panel members.

A pair of laterally extending inner shelves 80 are disposed adjacent the base 52 of the support bar 44 and are integrally formed with the stand portion 56. Each of the inner shelves 80 are connected to bowed legs 82 of base 52 and include a laterally extending leg 84. The laterally extending legs 84 each include a raised lip 86 at one end and an upstanding leg 88 intermediately positioned between the lip 86 and bowed leg 82. The raised lip 86 and upstanding leg 88 are positioned to form a channel 90 for receiving a seal 92 such as a strip of E.P.D.M. rubber or similar substance upon which the inner panel members 94 rests.

It has been found by applicant that at the pitch commonly used in greenhouse roofs 30, a mechanical securing means need not be provided to secure the inner panel members 94 onto the shelves 80. Generally, the conformability and coefficient of static friction of the seal 92, when added to the weight of the panel member 94, are sufficient to maintain the panel member 94 on the shelf 80, in a sealing relation. Additionally, the upstanding legs 88 of the inner shelves 80 of adjacent support bars 44 trap the panel member 94 and prevent it from moving laterally. The lack of a need for a mechanical securing means for securing the panel members 94 onto the shelves 80, and the positioning of the shelves 80, permits the panel members 94 to be placed onto the shelves 80 from the interior of the greenhouse 10.

In the embodiment shown in FIG. 3, the middle shelves 100 are designed to be selectively attachable to the stand portion 56 of the support bar 44. The middle shelves 100 are disposed between the inner 58 and outer 80 shelves, and are provided for supporting middle panel members 101. A pair of mating means such as J-shaped engaging flanges 102 are formed on the stand portion for selectively supporting the middle shelves 100. Each J-shaped flange 102 includes a laterally extending leg 104 and an inwardly angled leg 106 which together form a hook-like structure.

Each middle shelf 100 is formed to include a laterally extending leg 108. Leg 108 includes a first end 109 which is connected to the panel supporting portion 110 of the middle shelf, and a second end 112 which is positioned for engaging a side surface of the stand portion 56. Leg 108 also includes a mated means for mating with the J-shaped flange 102. The mated means comprises an outwardly angled, upwardly extending flange 114 which is sized and positioned to be mated with the inwardly angled leg 106 of the J-shaped flange 102. A downwardly angled leg 116, which forms an acute angle 118 with the laterally extending leg 108, provides additional support for the lateral leg 108 to maintain the shelf portion 110 in a horizontal position and to help bear the weight of panel member 101. The shelf portion 110 includes a laterally extending portion 120, a raised lip 122, and an upstanding leg 124. The laterally extending portion 120, raised lip 122, and upstanding leg 124 cooperate to form a channel 126 therebetween for receiving a seal 128 upon which the panel 101 rests. Seal 128 is preferably formed of a strip of E.P.D.M. rubber, similar to seal 92.

The middle shelves 100 are selectively attachable to the stand portion 56 to enable the owner of a greenhouse 10 to add a middle panel layer 101 to the support bar 44 at a date after the initial construction of the greenhouse 10. Middle shelf 100 is engaged to the J-shaped flange 102 by placing the shelf adjacent the stand portion 56 and rotating the shelf 100 so that the upwardly angled leg 114 engages the downwardly angled leg 106 of the flange 102, and the lateral leg 108 and downwardly extending leg 116 engage the stand portion 56.

When the three layers of panel members 60, 101, 94 are placed on the support bars 44, a greenhouse 10 wall is formed having a first dead air space 132 between the outer 60 and middle panel members 101, and a second dead air space 134 between the middle panel members 101 and the inner panel members 94. The placement of two dead air spaces 132, 134 between the interior 136 and exterior 138 of the greenhouse 10 impedes heat transfer between the interior 136 and exterior 138 of the greenhouse to provide for a better insulated greenhouse 10. The use of three light transmissive panel members 60, 101, 94 provides this superior insulation while still preserving the transmission of light necessary for promoting the growth of plants inside the greenhouse 10.

An alternate embodiment support bar structure 140 is shown in FIG. 4. Support bar 140 is generally similar to support bar 44 except that the stand portion 142 is generally longer than the stand portion 56 of support bar 44. This extended stand 142 provides a wider dead air space between the outer 58 and inner 90 shelves and hence the outer and inner panel members (not shown). As can be appreciated, this wider dead air space between the exterior 138 and interior 136 of the greenhouse provides better insulative qualities. Additionally, as stand portion 142 of support bar 140 is longer than stand portion 56 of support bar 44, support bar 140 will have greater vertical and horizontal strength than support bar 44.

An alternate embodiment support bar structure 144 is shown in FIG. 5. Support bar 144 is generally similar to support bar 44 shown in FIG. 3, except that support bar 144 includes an outer shelf 146 and cap structure 148 having a configuration different than outer shelf 58 and cap structure 72 of FIG. 3. Outer shelf 146 is generally broader than outer shelf 58, and includes a pair of upstanding seats 149 upon which outer panel members 60 rest. Cap structure 148 includes a pair of spaced, downwardly extending legs 152 which are generally parallel to the upstanding legs 78 of screw slots 76. The legs 152 are spaced widely enough to interiorly receive legs 78 for laterally positioning the cap structure 148 on the support bar 144. Preferably, legs 152 are long enough so that when the panel member 60 is interposed between the outer shelf 146 and cap structure 148, and the cap structure 148 is secured by fasteners 74 into screw slot 76, the legs 152 of the cap structure 148 will be at least partially co-extensive with the upstanding legs 78 of the screw slot 76. The coextensive placement of legs 78, 152 promotes the secure lateral positioning of the cap structure 148 on support bar 44.

Cap structure 148 also includes a pair of spaced, channel-forming legs 158 which are spaced for receiving a sealing strip 160 therebetween. Sealing strip 160 is preferably similar to E.P.D.M. rubber sealing strips 92 and 128, to provide a relative leakproof seal between the interior 136 and exterior 138 of the greenhouse 10.

An alternate embodiment support bar 163 is shown in FIG. 6. Support bar 163 is similar to support bar 144 (shown in FIG. 5) except that the J shaped flanges 165 extend outwardly from a leg of the outer shelf 166. The cap structure 168 is generally similar to the cap structure 148 shown in FIG. 5, except that the downwardly extending legs 170 are longer than the legs 152 of cap structure 148. The longer legs 170 are provided so that a portion of the legs 170 will remain coextensive with the upwardly extending legs 78 of the screw slot when a relatively thick, e.g., $\frac{1}{2}$ inch or $\frac{5}{8}$ inch (1.27 cm or 1.587 cm), panel 172 is used as the outer panel member. Such thick panels 172 include thermopane and other double layered panel members.

An alternate embodiment support bar 174 is shown in FIG. 7. Support bar 174 includes outer 175, middle 176, and inner 178 shelves which are all integrally formed with the stand portion 180 of the support bar 174. The middle shelves 176 are formed to be generally similar to the inner shelves 178 of the embodiment shown in FIG. 7, and are also generally similar to the inner shelves 80 of the support bar 44 shown in FIG. 3. Although all three shelves 175, 176, 178 are integrally formed with the stand portion 180, the middle 176 and inner 178 shelves are nevertheless configured to permit the greenhouse owner to add the middle 101 and inner 94 panel members to the support bar 174 from the interior of the greenhouse 10.

An alternate embodiment support bar 184 is shown in FIG. 8 as having middle shelves 192 which are selectively attachable to the stand portion 185. Support bar 182 also includes outer shelves 186 and inner shelves 188 which are integrally formed with the stand portion 185. The outer shelves 186 are similar in configuration to the outer shelves 146 shown in FIG. 5, and the inner shelves 188 are similar in configuration to the inner shelves 80 shown in FIG. 3. The stand portion 184 also includes a pair of J-shaped flanges 190 for selectively engaging the middle shelves 192. The J-shaped flanges 190 shown in FIG. 8 are similar to the J-shaped flanges 102 shown in FIG. 3. The middle shelves 192, although selectively attachable to the support bar 182, are configured differently than middle shelves 100 shown in FIG. 3. Each middle shelf 192 includes a generally laterally extending leg 194 which is connected to an upwardly angled leg 196 for engaging the J-shaped flange 190. A downwardly extending leg 198 is disposed generally perpendicular to the laterally extending leg 194, and is connected to one end thereof. Leg 198 is provided for engaging the stand portion 184 to support the laterally extending leg 192 in a generally horizontal position.

Figure 9:
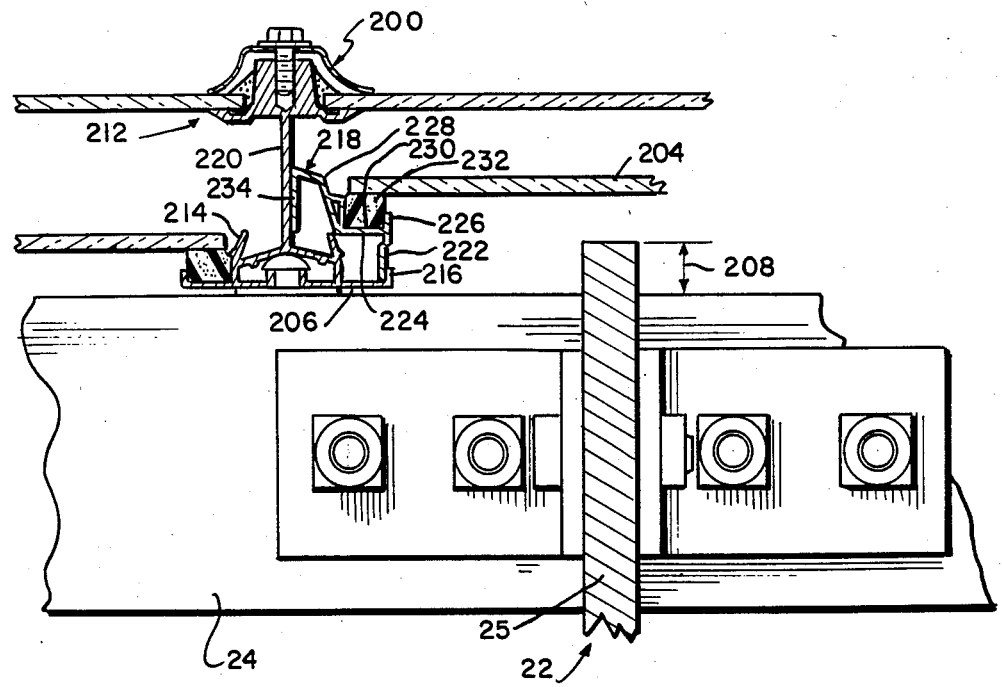
FIG. 9 is a sectional view of another embodiment of a panel member support structure of the present inventions.

An alternate embodiment support bar 200 is shown in FIG. 9. Support bar 200 is shown as supporting only two panel members, although it could be adapted to support a triple-glaze panel system. Support bar 200 is adapted for use in situations wherein the inner panel member 204 needs to be raised above the level at which the inner shelf 206 would normally place the panel member 204. One such situation involves those existing greenhouse structures wherein the purlin 24 is bolted to the sides of the rafter 25 of the truss 22, and the rafter 25 includes a portion 208 which extends vertically above the purlin 24.

The support bar 200 includes inner shelves 206 and outer shelves 212 which are similar to the inner and outer shelves 58, 80 shown in FIG. 3. Each inner shelf 206 includes an upstanding leg 214, and a raised rim or lip 216. An extruded riser 218 is selectively engageable with the inner shelf 206 and the side surface of the stand portion 220 to form a shelf 224 which is raised above the level of the lower shelf 206. Riser 218 includes a vertically extending lower leg 222 which engages the inner surface of the lip 216 of the lower shelf 206. Shelf portion 224 is generally parallel to the existing inner shelf 206 and is bordered by a lip 226 and upstanding portion 228. The lip 226 and upstanding portion 228 form a seat 230 upon which a seal 232 seats. Seal 232 is preferably an E.P.D.M. rubber seal similar in composition and structure to seal 128 shown in FIG. 3. Riser 218 also includes a second vertically extending leg 234 which is positioned to engage a vertical side surface of the stand portion 220.

Figure 10:
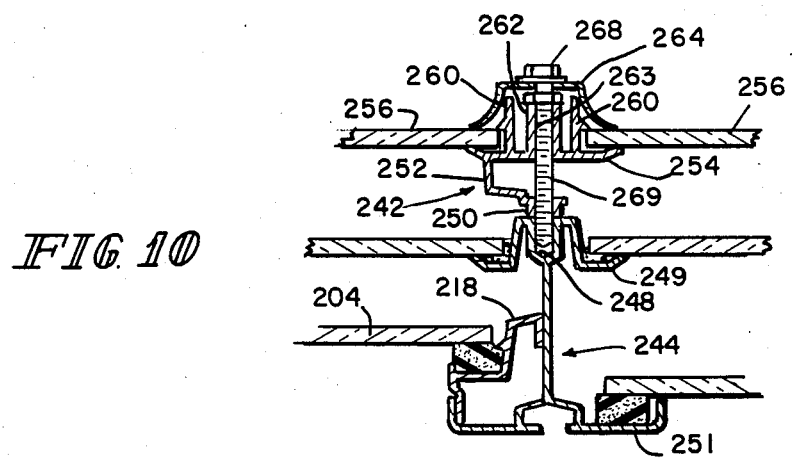
FIG. 10 is a sectional view of another embodiment of a panel member support structure of the present invention.

An add-on support bar 242 is shown in FIG. 10 which is provided for transforming an existing single or double glaze support structure 244 having an upwardly opening screw slot 248 and a pair of laterally extending shelves 249, 251 into a double or triple-glaze panel support structure respectively. The add-on support bar 242 includes a vertically downwardly extending tongue 250 which is insertable into the upwardly opening screw slot 248. A generally C-shaped support portion 252 is connected to the tongue 250 and extends above the tongue 250 to support a pair of laterally extending shelves 254. Laterally extending shelves 254 are provided for supporting outer panel members 256. A pair of parallel upstanding legs are connected to shelves 254 for laterally positioning the outer panel members 256. Another pair of parallel upstanding legs 262 are provided interiorly of legs 260 for forming a screw slot 263. When the vertically extending tongue 250 is inserted into screw slot 248, screw slot 263 of add-on support 242 is positioned directly above screw slot 248 of the existing support bar 244.

A cap structure 264 is placed over the legs 260, 262 of add-on support bar 242 to engage the outer panel members 256 to secure the panel members 256 onto the shelves 254. Cap structure 264 is generally similar to cap structure 72 shown in FIG. 3. A threaded fastener 268 is extendable through the cap structure 264 and into and through the screw slot 263 of the add-on support bar 242. The threads of the threaded fastener 268 engage the threads of the screw slot 263 to secure the cap structure 264 to the support bar 242. A second threaded fastener 269 extends downwardly through screw slot 263, through the support portion 252, and ultimately through the vertical tongue 250. The threads of the second threaded fastener 269 engage the threaded inner surface of the screw slot 248 to securely attach the add-on support bar 242 to the existing support bar 244.

An internal converter support plate 500 is shown in FIGS. 20 and 21 which is selectively attachable to an existing support bar 502 having closely spaced legs 506. Internal converter support plate 500 is especially useful in providing a support for inner panel members 501 on existing support bar structures 502 whose legs 506 are too closely spaced to permit the use of a riser 218 (shown in FIG. 10). The closely spaced nature of legs 506 can also present difficulty in placement of inner panels 201 on the shelves of legs 506, due to the lack of maneuvering room to maneuver the inner panel member 501 onto and off of the shelf of legs 506.

The internal converter support plate 500 includes an aperture (not shown) through which a bolt 510 can be passed for engaging the plate 500 to the underside of the base portion of existing support bar 502. Plate 500 includes a first side surface 514 and a second side surface 516. First side surface 514 is shown in FIG. 20 as being placed adjacent legs 506. The plate 500 can be inverted to place second side surface 516 adjacent legs 506, as shown in FIG. 21.

The first side surface 514 includes a pair of parallel upstanding legs 518 for laterally positioning the inner panel members 501. Parallel upstanding legs 518 are cooperatively positioned with a pair of upstanding lips 520 to form a channel for receiving seal 522. Seal 522 may be made from an E.P.D.M. rubber, similar to seal 92 shown in FIG. 3. The second side surface 516 includes a pair of spaced flanges 525. When the first side 514 is placed adjacent legs 506, as shown in FIG. 20, the flanges 525 serve no function. However, when the plate 500 is inverted to place second side 516 adjacent legs 506, flanges 525 provide a seat for receiving the vertically extending lower leg 527 of riser 529 in a manner similar to the manner in which lower leg 222 of riser 218 engages the inner surface of the lip 216 of the lower shelf 206 of support bar 200, as shown in FIG. 10.

As shown in FIG. 1, a panel member 46 between adjacent support bar 44 may comprise a unitary panel member extending between the ridge 34 and the wall joint 37. Alternately, several shorter length panel members may be used, with each member being generally as wide as the distance between adjacent support bars 44, but not sufficiently long to extend from the peak of the roof 34 to the wall joint portion 37. In cases wherein more than one panel member is used, means are provided for forming a joint between adjacent panel members. As shown in FIG. 11, outer panel members 60 are joined by being overlapped by approximately ¾ inch (1.905 cm.), with the overlapped portions being sealed with a translucent silicone sealer.

An extruded H-came 276 is inserted between a pair of adjacent coplanar inner or middle panel members to form a joint between the adjacent inner or middle panel members. The cames 276 shown in FIGS. 11 and 12 are extruded to be elongated in a direction generally transverse to the direction in which the support bars 44 are elongated. The cames 276 may be used for forming a joint between a pair of coplanar inner panel members 94, and between a pair of coplanar middle panel members 101. An enlarged cross sectional view of the came 276 of the present invention is shown in FIG. 12, as supporting a relatively higher placed panel member 280 and a coplanar, relatively lower placed panel member 294.

Came 276 includes an upwardly facing, generally horizontally extending supporting surface 278 for supporting an underside surface 279 of higher panel member 280. An upstanding leg 282 is connected to the supporting surface 278 and includes a portion 284 generally perpendicular to the supporting surface 278 for receiving an edge 285 of the higher panel members 280, and an angled portion 286 which extends above the panel member 280 for locking it in place and for forming a dam for trapping moisture 288 which flows downwardly on the panel member 280. A spacer 290 is formed on the supporting surface 278 for permitting moisture which collects on the underside 279 of panel member 280 to flow along supporting surface 278 and around the edge 285 of the panel member 280.

The came 276 also includes a C-shaped portion 292 for receiving the relatively lower panel member 294. The C shaped portion 292 includes a supporting leg 296 for supporting a lower surface of the panel member 294, an end leg 298 which is received adjacent an edge of the panel member 294, and a top leg 300 which extends above the upper surface of panel member 294. Top leg 300 is provided for helping to maintain panel member 294 in position on the came 276 when wind gusts or other air movements force the panel member 294 upwardly. For example, such a wind gust could occur when a door was opened in the greenhouse 10, allowing outside air to enter the greenhouse and blow upwardly against an inner panel member. The end leg 298 and upstanding leg 284 define a transverse channel 302 which extends along the length of the came 276. The channel 302 is provided for conducting moisture which flows over the dam formed by angle member 286 transversely to a roof support bar 44 or other guttering channel, wherein the moisture can be conducted downwardly along the roof 30 to a gutter 40 of the roof. Alternatively, the moisture so collected can be directed to the interior of the greenhouse 10 for aiding in the watering of the plants therein.

Figure 2:
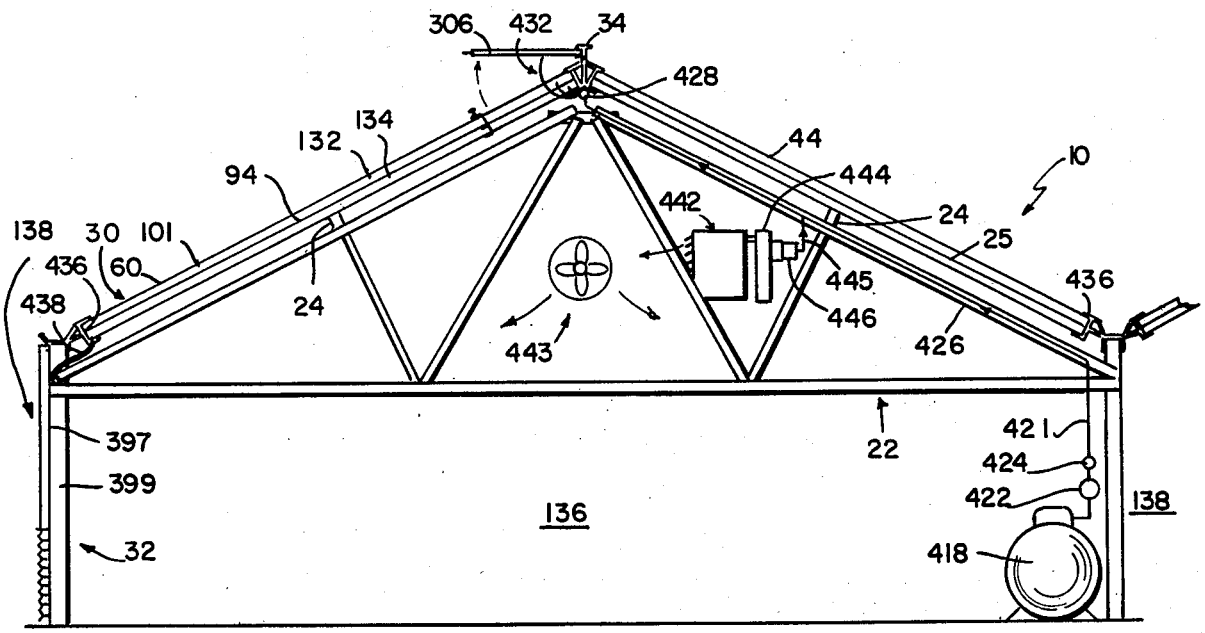

The greenhouse 10 is shown in FIG. 2 as including a vent 306 which is hingedly mounted to the roof peak structure 34 at one end and is movable between an open position (shown in solid) and a closed position to permit air too hot to be vented or exhausted from interior 136 and cooler outside air to enter 136 as needed.

An extruded support bar structure 307 for the vent 306 is shown in cross section in FIG. 13 as including a base 308 having a shelf 310. Shelf 310 includes a pair of upwardly facing seats 311 for receiving the underside surface 312 of a double-layered plastic or glass panel 314. The base 308 includes a pair of upstanding legs 316 which form a central, upwardly opening screw slot 318. A cap structure 320 for the base 308 is generally similar to cap structure 168 shown in FIG. 6. Cap structure 320 includes shelf 321 having a pair of channel-forming legs 322 which form a channel in which a seal 324 can be placed for sealingly engaging a top surface 326 of the double-layered panel 314. The cap also includes a pair of spaced, downwardly extending legs 328 which are spaced by a sufficient distance to interiorly receive the upstanding legs 316 of screw slot 318 and are long enough so that when the panel 314 is interposed between the cap structure 320 and shelf 310, the downwardly extending legs 328 of the cap structure 320 will be at least partially coextensive with the upstanding legs 316 of the shelf 310. A screw or carriage bolt 329 is extended through the cap structure 320 and between the legs 328 to engage the upwardly extending legs 316 of the base member 308 to secure the cap structure 320 to the base 308.

An alternative vent bar structure 309 for vent 306 is shown in cross section in FIG. 19. Vent bar structure 309 includes a base 313 having a two position shelf 315. Shelf 315 includes an upper shelf portion 317 for supporting an outer panel member 319. Upper shelf portion 317 is disposed adjacent the base 313. Shelf 315 also includes a lower shelf portion 323 for supporting an inner panel member 325. A cap 327, which is generally similar to cap 72 shown in FIG. 3, is provided for sealing the outer panel member 319 onto upper shelf portion 317. A spacer 331 is provided for maintaining the outer panel member 319 and inner panel member 325 in spaced relation, and for maintaining inner panel member 325 on lower shelf portion 323. Support bar 309 is particularly useful in situations wherein two panel members, 319, 325, are being installed simultaneously.

An extruded support bar 330 which is especially adapted for supporting panel members of the side wall 32 is shown in FIG. 14. The bottom portion of the support bar 330 is attached to the extruded lower cross (sill) beam 20. In cross section, sill beam 20 includes a laterally extending leg 338. Laterally extending leg 338 may include a hole through which bolt 340 passes for securing the sill beam 20 to the support post 16 (shown in FIG. 1). A pair of spaced, parallel upstanding supports 348 are connected to the laterally extending leg 338 to form panel seat surfaces and for supporting the support bar 330 in a spaced relation to the sill beam 20. Sill beam 20 also includes first and second vertically extending legs 342, 344 which are provided for receiving insulating or other lower curtain wall panels or masonry. A third vertically extending leg 350 is generally coplanar with second leg 344 and extends upwardly along a side of the support bar 330. A bolt 352 may pass through the third extending leg 350 to securely attach the sill cross beam 20 to the support bar 330.

Another alternative vent bar structure 600 for vent 309 be shown in cross section in FIG. 22 includes a seating portion 606 and a C-shaped laterally outward end 608. A butyl rubber bedding is placed on both the upper and lower surfaces of the seating portion 606 for providing a seat for an outer 610 and an inner 612 panel member. Outer 614 and inner 616 aluminum bar cap are similar to caps 72 (shown in FIG. 3) and are provided for securing the outer 610 and inner 612 panel members on to the vent bar structure 600.

The support bar 330 is shown in cross section in FIG. 15 to include outwardly facing, outer shelves 354, inwardly facing inner shelves 356, and inwardly facing middle shelves 358. The arrangement of the shelves 354, 356, 358 of the support bar 330 differs from the roof wall support bars shown in FIGS. 3-10 wherein the shelves all face outwardly. The outer shelves 354 are provided for supporting outer light transmissive panel members 360; the inner shelves 356 are provided for supporting inner panel members 364; and the middle shelves 358 are provided for supporting middle panel members 366 of a triple glaze wall structure. The side wall panel seat members 354, 356, 358, when in place, form first and second dead air spaces 397, 399, with the first dead air space 397 being defined by the outer 360 and middle 366 panel members, and the second air space being defined by the middle 366 and inner 364 panel members.

The outer shelves 354 and middle shelves 358 are connected by a first stand portion segment 368, and the middle shelves 358 and inner shelves 356 are connected by second, S-shaped stand portion segment 370. An outwardly opening threaded screw slot 372, formed by a pair of upstanding legs 374, is provided adjacent outer shelves 354 for receiving a screw 376. Screw 376 secures a cap structure 378 onto the support bar 330 for securing the outer panel members 360 onto the outer shelves 354. A sealing means 380 is interposed between the panel members 360 and the outer shelves 354 to prevent the flow of heat, moisture, and air around the outer panel member 360. An inwardly opening screw slot 382 which is formed by a pair of upstanding legs 384 is disposed adjacent the inner shelves 356 for receiving a screw 386 which extends through an inner cap structure 388. Inner cap structure 388 is provided for securing the inner panel members 364 to the inner shelves 356.

U shaped clips 390 are shown in FIGS. 14 and 15. The clips 390 are provided for securing the middle panel members 366 onto the middle shelves 358 and are preferably formed out of a spring alloy. Each clip 390 includes a pair of identical, parallel legs 392, each of which have formed lips 394 at their end. One of the lips 394 is provided for engaging an upstanding leg 398 of one of the middle shelves 358 to maintain the middle panel member on the middle shelves 358. The other lip is positioned to engage a corner 400 of the inner shelf 356.

The side wall support bar 330 shown in FIGS. 14 and 15 is similar to the roof support bars shown in FIGS. 3-10 in that the support bar 330 is designed to enable a greenhouse owner to add the inner 364 and middle 366 shelves to the bar 330 at a date after the original installation date of the suppor bar 330 and outer panel member 360. Both of the inner 364 and middle 366 panel members can be placed on the support bar from the interior of the greenhouse.

A roof peak structure is shown in cross section in FIG. 17. As discussed above, roof peak structure 34 extends generally along the length of the roof at the peak of the roof. The peak structure 34 includes a vent attaching portion 404 to which a vent such as vent 306 (shown in FIG. 2) can be hingedly mounted. The peak structure 34 also includes a first vent header portion 406 and a second, ventless header portion 408 which are attachable to the upper ends of the support bars 44 for joining the support bars 44 of one half of the roof 30 to the support bars of the other half of the roof 30.

An extruded wall joint structure 37 and gutter assembly for the triple glazed greenhouse of the present invention is shown in cross section FIG. 18. Wall joint structure 37 is attached to the support post 16 of the greenhouse 10. The wall joint structure 37 includes a roof header 412 which is attached to support bars 44 of the roof 30 and supports the roof support bars 44 and panel members 46. Header 412 also provides an end seal for the first and second dead air spaces 132, 134. Similarly, wall header 412 is attached to the support bars 330 of the side wall 32. Wall header 414 also serves as an end structure to seal the ends of the dead air spaces between the panel members 360, 366, 364 of the side wall structure. An L-shaped double glass stop 413 is attached to wall header 412 for providing a stop for the inner 415 and middle 416 panel members. Cames 276 are interposed beween the panel members 415, 416 and the double glass stop 413.

FIG. 2 diagrammatically illustrates means provided by the instant invention to improve the insulative quality of the greenhouse 10 by introducing a gas which has a thermal conductivity lower than air, and which is beneficial to plant growth. The gas is introduced into the dead air spaces to replace the air which would normally be in the dead air spaces of the wall 30, 32 of a greenhouse 10 having either a double- or triple-glaze structure. The preferred gas is carbon dioxide.

Carbon dioxide serves a dual purpose. Plants utilize a photosynthetic process to grow, reproduce, repair, and develop. The photosynthetic process utilizes water and carbon dioxide as reactants to form tissue and oxygen as products. Therefore, the introduction of carbon dioxide into an area wherein plants are growing promotes the photosynthetic process, and ultimately, the growth of plants. Additionally, carbon dioxide has a lower thermal conductivity than air. The thermal conductivity of carbon dioxide at 20° C. is 33.68 cal/(sec) (cm$^2$) (°C./cm)×10$^{-6}$, whereas air has a thermal conductivity at 20° of 56.24 cal/(sec)(cm$^2$)(°C./cm)×10$^{-6}$. Thus, dead air spaces filled with carbon dioxide are poorer conductors of heat than dead air spaces filled with air. Consequently, the insulative qualities of the greenhouse 10 improve through the use of carbon dioxide in the dead air spaces rather than air.

Applicant has also found that if a dry carbon dioxide is introduced into the dead air spaces, the carbon dioxide will help to remove moisture which condenses in the dead air spaces. Removal of moisture from the dead air spaces is beneficial to plant growth because the condensation which forms on the wall panel members can reduce the amount of sunlight which passes through the walls and hence ultimately reaches the plants.

As best shown in FIG. 2, the means for providing carbon dioxide includes a first gas source such as a carbon dioxide supply tank 418. The supply tank 418 is provided for holding carbon dioxide and delivering the carbon dioxide to a supply conduit 421. A pressure regulator 422 is placed in the supply conduit 421 to regulate the pressure of the carbon dioxide in the supply conduit 421. Preferably, pressure regulator 422 is a variable regulator which permits the greenhouse owner to adjust the amount and pressure of carbon dioxide introduced into the dead air space, and hence enables the greenhouse owner to control the amount of carbon dioxide delivered to the plants. Additionally, a solenoid valve 424 which is controlled by a photocell preferably facing east is placed in the supply conduit 421. The photocell faces east to open the solenoid valve 424 at daylight to permit carbon dioxide to flow through the conduit 421. Alternatively, a clock timer (not shown) or manual control (not shown) could be provided to regulate the flow of carbon dioxide through supply conduit 421.

Supply conduit 421 delivers the carbon dioxide into a supply conduit 426 which extends generally parallel with an upper bar 25 of the superstructure 22 for delivering carbon dioxide to a supply line 428. Supply line 428 extends along the peak or ridge of the roof generally parallel and under peak structure 34. Through this arrangement, gas in the supply line 428 can be delivered to all of the various dead air space compartments formed between the plurality of support structures 44.

The supply line 428 includes a plurality of apertures (not shown) through which supply tubes 432 can extend. Supply tubes 432 extend from the apertures of the supply line 428 into upper headers (not shown) which extend between adjacent support bars 44, near the upper ends of the support bars 44. The tubes 432 extend through the upper headers to deliver the carbon dioxide to the first and second dead air spaces 132, 134. Because carbon dioxide is heavier than air, the carbon dioxide in the dead air spaces 132, 134 will naturally tend to fall downwardly toward the lower headers 436 of the roof support structure. Tubing 438 is provided for conducting gas between the dead air spaces 132, 134 of the roof, and the dead air spaces 397, 399 of the side or end walls. Once in the side or end walls, the carbon dioxide will tend to travel downward.

Means (not shown) are also provided for enabling the carbon dioxide in the dead air spaces to escape into the interior 136 of the greenhouse, so that the gas can contact the plants (not shown) in the greenhouse to promote their growth. One means for directing the carbon dioxide into the interior greenhouse involves the selectively leakproof seal of the roof inner and middle panel members 101, 94, and side wall inner and middle panel members 366, 364. Applicant has found that by sealing the outer panel members 60, 360 to the outer shelves 58, 354 in a relatively more leakproof manner, while sealing the inner panels members 94, 364 to their respective inner shelves 80, 356, and the middle panel members 101, 366 to their respective middle shelves 100, 358 in a relatively less leakproof manner, the carbon dioxide gas which is introduced into the dead air spaces 132, 134 and 397, 399 under pressure will tend to escape preferentially from the dead air spaces 132, 134 and 397, 399 toward the interior 136 of the greenhouse 10. The relatively tight seals between the outer panel members 60, 360 and the outer shelves 58, 380 prevents any substantial flow of gas outwardly from the dead air spaces to the exterior 138 of the greenhouse 10.

An additional or second gas source 442 is also shown. Second gas source comprises a heater 442 which burns a fossil fuel such as LP gas to heat the interior 136 of the greenhouse 10. Such LP gas heaters are currently used in many greenhouses. The LP gas heater 442 burns the LP gas to provide hot air in the greenhouse. The hot air is distributed throughout the greenhouse by a fan 443. As is known, the by-product of the burning of a fossil fuel consists essentially of carbon dioxide and water. The exhaust gas from the heater 442 is first passed through a water removal device 444 to remove the water from the carbon dioxide and is then introduced into a supply conduit 445. The removal of water from the exhaust gas facilitates the removal of moisture from the dead air spaces 132, 134, 397, 399 by the carbon dioxide. An appropriately sized pressure creating and inducing device 447 is provided for feeding carbon dioxide to pressure regulator 446, to maintain a positive pressure of carbon dioxide in supply conduit 446.

A pressure regulator 446 similar to pressur regulator 422, is placed in the supply conduit 445. The supply conduit 445 directs the carbon dioxide into supply conduit 426 and ultimately into supply line 428 and dead air spaces 132, 134, 397, 399.

Although the invention has been described in detail with reference to certain preferred embodiments and specific examples, variations and modifications exist within the scope and spirit of the invention as described and as defined in the following claims.

What is claimed is:

1. An elongated, extruded support bar for light transmissive panel members of a greenhouse comprising, in cross section, a generally vertical stand portion having a base and a crown, a laterally extending outer shelf adjacent the crown for supporting an outer panel member, a laterally extending inner shelf adjacent the base for supporting an inner panel member, and a laterally extending middle shelf supported by the support bar between the outer shelf and inner shelf for supporting a middle panel member, the support bar including an engaging flange integrally formed with the stand portion for selectively engaging the middle shelf, the middle shelf including a first leg for selectively engaging the engaging flange and a second leg for supporting the middle shelf generally perpendicularly to the stand portion, the inner and middle shelves being dimensioned to permit the inner and middle panel members to be placed on the inner and middle shelves from inside the greenhouse.

2. The invention of claim 1 wherein the integrally formed engaging flange of the support bar comprises, in cross section a J-shaped flange, and the first leg of the middle shelf comprises a flange engaged with the J-shaped flange of the support bar.

3. The invention of claim 2 wherein the inner and outer shelves are integrally formed with the stand portion.

4. The invention of claim 1 wherein at least one of the inner and middle shelves includes a formed channel portion, and further comprising a sealing neans received by the channel, the sealing means including a surface for contacting one of the inner and middle panel members.

5. The invention of claim 1 wherein the inner shelf includes an upwardly extending lip at its laterally outer end, further comprising a riser selectively engageable with the inner shelf for placing the inner panel member above the inner shelf, the riser including a shelf portion, a first leg engageable with the lip of the inner shelf and a second leg engageable with said stand portion for supporting the shelf portion in a plane generally parallel with the inner shelf.

6. An elongated extruded support bar for light transmissive panel members of a greenhouse comprising, in cross section, a generally vertical stand portion having a base and a crown, a laterally extending outer shelf adjacent the crown for supporting an outer panel member, a laterally extending inner shelf adjacent the base for supporting an inner panel member, mating means disposed between the outer and inner shelves for receiving a laterally extending middle shelf, and a laterally extending middle shelf having mated means for selectively being mated to the mating means.

7. The invention of claim 6 wherein the mating means comprises a J-shaped flange, the middle shelf includes a laterally extending leg for supporting a middle panel member, and the mated means comprises an upwardly angled leg for engaging the J-shaped flange and a downwardly extending leg engageable with the stand portion.

8. The invention of claim 7 wherein the downwardly extending leg is generally perpendicular to the laterally extending leg.

9. The invention of claim 7 wherein the downwardly extending leg forms an acute angle with a portion of the laterally extending leg adjacent the stand portion.

10. The invention of claim 6 further comprising means in the crown of the vertical stand portion for receiving a cap to secure an outer panel to the laterally extending outer shelf.

11. The invention of claim 6 further comprising a generally T-shaped ridge extending outward from the vertical stand portion immediately above the laterally extending outer shelf.

12. The invention of claim 6 wherein the base of the generally vertical stand portion is bifurcated and includes a pair of outwardly and downwardly bowed legs, the space between the legs being adapted to receive fastening means for fastening said support bar to adjacent structure.

13. The invention of claim 6 wherein the laterally extending inner shelf includes an upstanding leg for preventing a panel situated on the shelf from moving laterally.

14. The invention of claim 13 wherein the laterally extending inner shelf also includes a raised lip which together with the upstanding leg forms an elongated channel for receiving a seal.

15. The invention of claim 6 wherein at least one of the laterally extending shelves includes a pair of spaced upstanding seats for supporting a panel member thereon.

16. The invention of claim 6 further comprising a web portion upwardly inclined from and unitary with the generally vertical stand portion, said laterally extending outer shelf and said mating means unitarily extending from the web portion.

17. An elongated support bar for supporting light transmissive panel members of a greenhouse comprising, in cross section, a generally vertical stand portion having a base and a crown, a laterally extending outer shelf adjacent the crown for supporting an outer panel member, a laterally extending inner shelf adjacent the base for supporting an inner panel member, and a laterally extending middle shelf between the outer and inner shelves for supporting a middle panel member, the inner and middle shelves including an upstanding elongated leg and a raised lip along the extremity of the shelf, the upstanding leg and the raised lip defining therebetween a channel for receiving sealing means for sealingly contacting a panel situated thereon, the upstanding leg being spaced outwardly from the generally vertical stand portion by a distance greater than the distance between the upstanding leg and the lip to thereby permit the inner and middle panel members to be placed on the inner and middle shelves from the inside of the greenhouse while an outer panel member remains fixed in position on the outer shelf.

18. The invention of claim 17 wherein the outer and inner shelves are integrally formed with the stand portion and the middle shelf is selectively attachable to the support bar.

19. The invention of claim 17 wherein the support bar includes a J-shaped flange and the middle shelf includes a J-shaped flange selectively engageable with the J-shaped flange of the support bar for supporting the middle shelf on the support bar.

20. The invention of claim 17 wherein the outer, inner, and middle shelves are unitarily formed with the stand portion.

* * * * *

UNITED STATES PATENT AND TRADEMARK OFFICE
CERTIFICATE OF CORRECTION

PATENT NO. : 4,658,559

DATED : April 21, 1987

INVENTOR(S) : Doherty

It is certified that error appears in the above-identified patent and that said Letters Patent is hereby corrected as shown below:

In Col. 4, line 26, after "greenhouse", insert --embodying--.

In Col. 4, line 33, after "the", insert --present--.

In Col. 14, line 48, delete "adJust" and insert --adjust--.

Signed and Sealed this

Tenth Day of November, 1987

Attest:

DONALD J. QUIGG

*Attesting Officer*  *Commissioner of Patents and Trademarks*